(12) United States Patent
Sharkar

(10) Patent No.: US 9,815,364 B2
(45) Date of Patent: Nov. 14, 2017

(54) WORK VEHICLE HAVING ENGINE MOUNTED THERETO

(71) Applicant: KUBOTA CORPORATION, Osaka (JP)

(72) Inventor: Fahmid Sharkar, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 19 days.

(21) Appl. No.: 14/987,979

(22) Filed: Jan. 5, 2016

(65) Prior Publication Data

US 2017/0190247 A1 Jul. 6, 2017

(51) Int. Cl.

| | |
|---|---|
| *B60K 13/02* | (2006.01) |
| *B60K 11/04* | (2006.01) |
| *B60K 15/03* | (2006.01) |
| *B60N 2/50* | (2006.01) |
| *B60N 2/38* | (2006.01) |
| *A01D 34/82* | (2006.01) |
| *A01D 34/64* | (2006.01) |
| *A01D 101/00* | (2006.01) |

(52) U.S. Cl.
CPC ............... *B60K 15/03* (2013.01); *A01D 34/82* (2013.01); *B60N 2/38* (2013.01); *B60N 2/50* (2013.01); *A01D 34/64* (2013.01); *A01D 2101/00* (2013.01); *B60K 2015/03328* (2013.01)

(58) Field of Classification Search
CPC ........ B60K 13/02; B60K 13/06; B60K 11/04; F02M 35/10091; F02M 35/048; F02M 35/161; F02M 35/10013; B62D 25/084
See application file for complete search history.

(56) References Cited

U.S. PATENT DOCUMENTS

| | | | |
|---|---|---|---|
| 4,577,719 A | 3/1986 | Nomura | |
| 5,133,588 A * | 7/1992 | Hutchinson | .......... B60K 15/063 |
| | | | 297/188.06 |
| 5,876,085 A * | 3/1999 | Hill | ........................ B60N 2/542 |
| | | | 296/65.02 |
| 8,418,678 B2 | 4/2013 | Ochi et al. | |
| 8,690,190 B2 | 4/2014 | Spitz et al. | |
| 2010/0281973 A1 | 11/2010 | Elmore | |
| 2014/0109535 A1 * | 4/2014 | Spitz | .................... B60K 15/073 |
| | | | 56/14.7 |

FOREIGN PATENT DOCUMENTS

DE 10 2008 059682 6/2010

OTHER PUBLICATIONS

European Search Report issued in EP 16198671.6 dated May 9, 2017 (7 pages).

* cited by examiner

*Primary Examiner* — Bryan Evans
(74) *Attorney, Agent, or Firm* — Greenblum & Bernstein, P.L.C.

(57) ABSTRACT

A work vehicle having an engine mounted thereto includes a vehicle body frame extending in the longitudinal direction of vehicle, a seat supporting deck supported to the vehicle body frame via a suspension unit, a driver's seat supported to the seat supporting deck upwardly of this seat supporting deck, a fuel tank supported to the seat supporting deck downwardly of the driver's seat and supplying fuel to the engine; and a canister supported to the seat supporting deck and connected to the fuel tank.

18 Claims, 7 Drawing Sheets

Fig. 1

WORK VEHICLE HAVING ENGINE MOUNTED THERETO

TECHNICAL FIELD

The present invention relates to a work vehicle having an engine mounted thereto.

BACKGROUND ART

A work vehicle having an engine mounted thereto includes a canister in consideration to environmental problem. The canister adsorbs fuel gas evaporated inside a fuel tank when the engine is stopped (in particular, at the time of fuel filling) and desorbs the adsorbed fuel gas when the engine is driven, to be introduced into the engine for its combustion therein. In this way, the canister restricts emission of fuel gas evaporated inside the fuel tank (evaporated gas) into the atmosphere.

In a grass mower machine according to U.S. Pat. No. 8,418,678, downwardly and rearwardly of left and right fenders, a fuel tank is attached via a ROPS frame to positions respectively upwardly of left and right rear wheels. And, a canister is incorporated within a fuel passage arranged between the fuel tank and an engine. A main tank portion of the fuel tank is disposed downwardly of a driver's seat. The fuel tank and the canister are fixed to a vehicle body frame.

In a grass mower machine according to U.S. Pat. No. 8,690,190, in a rear region of a vehicle body frame, there is formed a mounting face for mounting an engine. And, on this mounting face, an auxiliary tank portion of a fuel tank and a canister are disposed. A main tank portion of the fuel tank is disposed downwardly of a driver's seat. The engine, the auxiliary tank portion and the canister are disposed without any overlap as seen in a plane view, thus making the length of a hose connected therebetween short.

SUMMARY

Problem to be Solved by Invention

If a fuel tank and a canister are supported to a vehicle body frame, stable fixing can be obtained. On the other hand, vibration of the vehicle body frame will be transmitted directly to the fuel tank and the canister.

For this reason, there is a need for further improvement with respect to layout of a fuel tank and a canister.

Solution

A work vehicle having an engine mounted thereto, according to the present invention, comprises:

a vehicle body frame extending in the longitudinal direction of vehicle;

a seat supporting deck supported to the vehicle body frame via a suspension unit;

a driver's seat supported to the seat supporting deck upwardly of this seat supporting deck;

a fuel tank supported to the seat supporting deck downwardly of the driver's seat and supplying fuel to the engine; and a canister supported to the seat supporting deck and connected to the fuel tank.

With the above-described arrangement, the fuel tank and the canister are supported to a seat supporting deck which in turn is supported to the vehicle body frame via a suspension unit for providing the driver's seat with a suspension arrangement. Thus, transmission of vibration of the vehicle body from this vehicle body to the seat supporting deck is relieved by the suspension unit. As a result, transmission of vehicle body vibration to the driver's seat, the fuel tank and the canister is also relieved. Moreover, since the fuel tank and the canister are both supported to the seat supporting deck as a common supporting member therefor, no separate or individual movements will occur in the fuel tank and the canister, so that e.g. a bending load to a canister hose connecting between the fuel tank and the canister will less likely occur.

A work vehicle requires mounting of a utility implement to its vehicle body. Thus, it is desired to implement layout of various instruments to be mounted to the vehicle body in an efficient manner. To meet this desire, according to a preferred embodiment of the present invention, the fuel tank is fixed to a lower face of the seat supporting deck; and the canister also is fixed to the lower face of the seat supporting deck in vicinity of a front wall of the fuel tank.

With the above arrangement, the fuel tank is disposed within a space which results from the cushioning arrangement using a cushion unit. Further, the disposing of the canister in the vicinity of the front wall of the fuel tank provides an advantage of shortening the length of the canister hose connecting between the fuel tank and the canister.

EMBODIMENTS

Figure 1:
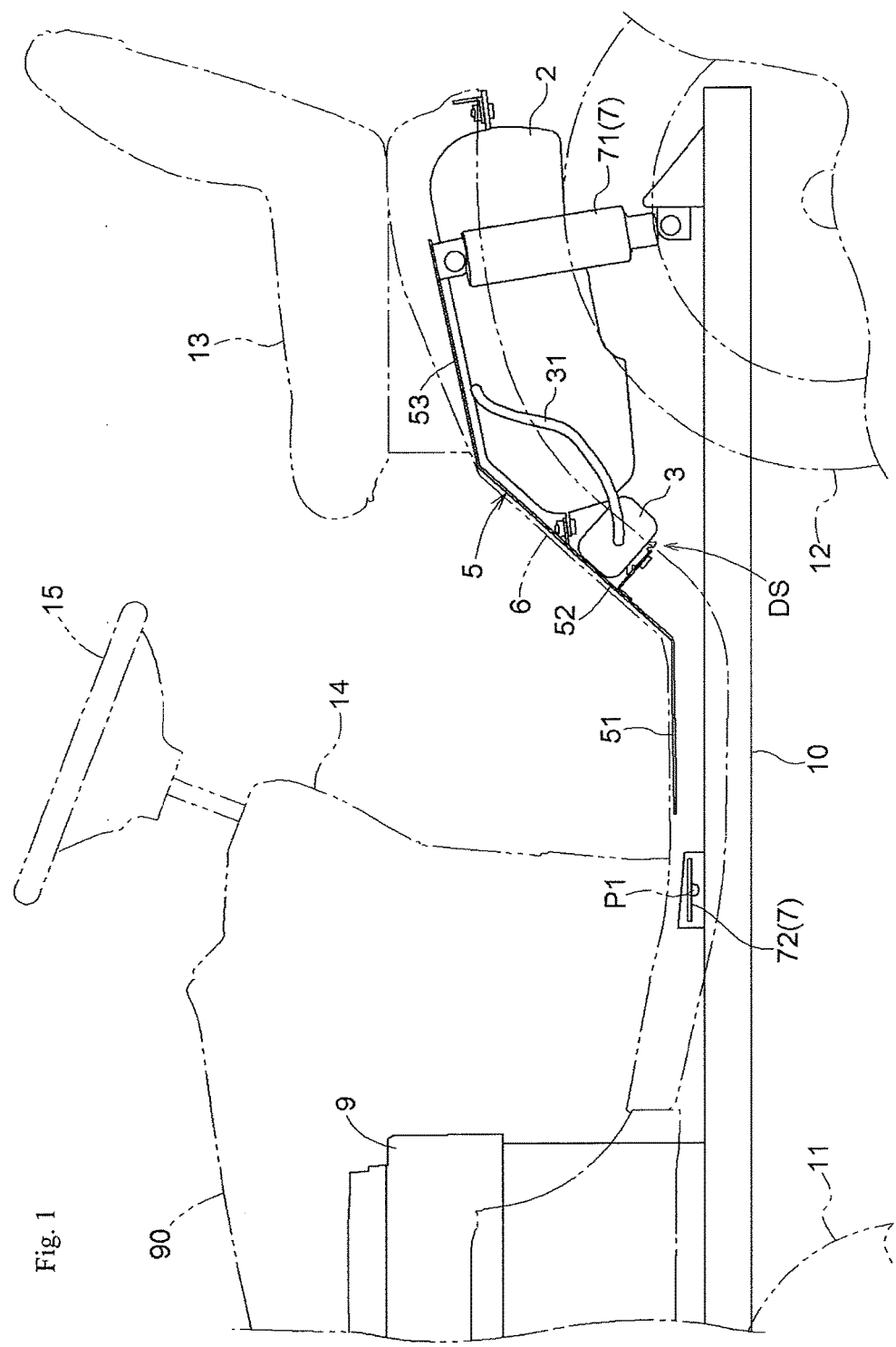
FIG. 1 is a schematic showing a basic layout of a driver's seat, a fuel tank and a canister employed in a work vehicle according to the present invention.

Before specific embodiments of a work vehicle according to the present invention are explained, with reference to FIG. 1, there will be explained firstly a basic layout of a driver's seat, a fuel tank and a canister employed in a work vehicle according to the present invention. The work vehicle schematically illustrated in FIG. 1 includes a vehicle body frame 10 which is supported on the ground surface via front wheels 11 and rear wheels 12.

Incidentally, in this detailed description, a direction along a centerline of a vehicle body of the work vehicle (traveling direction) will be referred to simply as a front-rear direction or a longitudinal direction. Further, a direction along a vehicle body width will be referred to as a vehicle body transverse direction or simply as a transverse direction or as a left-right direction (right side, left side). And, a direction perpendicular to the ground surface will be referred to as a vertical direction (upper side, lower side).

At a front portion of the vehicle body frame 10, an engine 9 is disposed. At a rear portion of the vehicle body frame 10, a driver's seat 13 is disposed. Between the engine 9 and the driver's seat 13, a handle post 14 having a steering wheel 15 is disposed.

The driver's seat 13 is mounted to the vehicle body frame 10 via a suspension arrangement. Thus, a seat supporting deck 5 extending downwards from the driver's seat 13 toward the handle post 14 is attached to the vehicle body frame 10 via a suspension unit 7. In the example shown in FIG. 1, the suspension unit 7 consists essentially of suspension modules 71 and pivot modules 72. The suspension modules 71 comprise a pair of left and right well-known spring dampers (can alternatively be springs alone or dampers alone). The pivot modules 72 comprise a pair of left and right pivot modules each having a pivot axis P1 extending along the left-right direction. A front portion of the seat supporting deck 5 is attached to the vehicle body frame 10 via the pivot modules 72, whereas a rear portion of the seat supporting deck 5 is attached to the vehicle body frame 10 via the suspension modules 71. With this arrangement, the seat supporting deck 5 is vertically pivotable about the pivot axes P1, and a displacement of this vertical pivotal movement which is a suspension stroke is braked by the suspension module 71.

To an upper face of a rear portion of the seat supporting deck 5, the driver's seat 13 is fixed across the fender unit 6. To a lower face of the rear portion of the seat supporting deck 5, the fuel tank 2 is fixed. In the example shown in FIG. 1, the fuel tank 2 has a horizontal sectional area which is approximately equal to a lower face of a seat cushion of the driver's seat 13 and extends between the pair of left and right suspension modules 71. Needless to say, the fuel tank 2 can have a larger horizontal sectional area than the lower face of the seat cushion of the driver's seat 13. Conversely, the fuel tank 2 can have a smaller horizontal sectional area than the lower face of the seat cushion of the driver's seat 13. Further alternatively, the fuel tank 2 can extend beyond the space between the suspension modules 71 or can be disposed at a space different from the space between the suspension modules 71.

The seat supporting deck 5, in the example shown in FIG. 1, is formed by bending of a plate member and is sectioned into a first plate portion 51, a second plate portion 52 and a third plate portion 53 in the vehicle body front-rear direction. The first plate portion 71 is a portion which supports a floor receiving feet of a driver seated at the driver's seat 13. The third plate portion 53 is a portion supporting the driver's seat 13 and the fuel tank 2. As the third plate portion 53 is higher than the first plate portion 51, the second plate portion 52 therebetween assumes a tilted posture.

As the second plate portion 52 assumes the tilted posture above, between the front end face of the fuel tank 2 and the lower face of the second plate portion 52, there is formed a free space DS having a triangular cross section in a side view. With this, the fuel tank 2 and the canister 3 are fixed to the lower face of the seat supporting deck 5, so that the canister 3 follows movement of the fuel tank 2 when it occurs. The above arrangement allows reduction in the length of a canister hose 31 which connects between the canister 3 and the fuel tank 2. Further, as the canister 3 follows any movement of the fuel tank 2, substantially no bending load will be applied even at the time of traveling on a rough ground surface.

Figure 2:
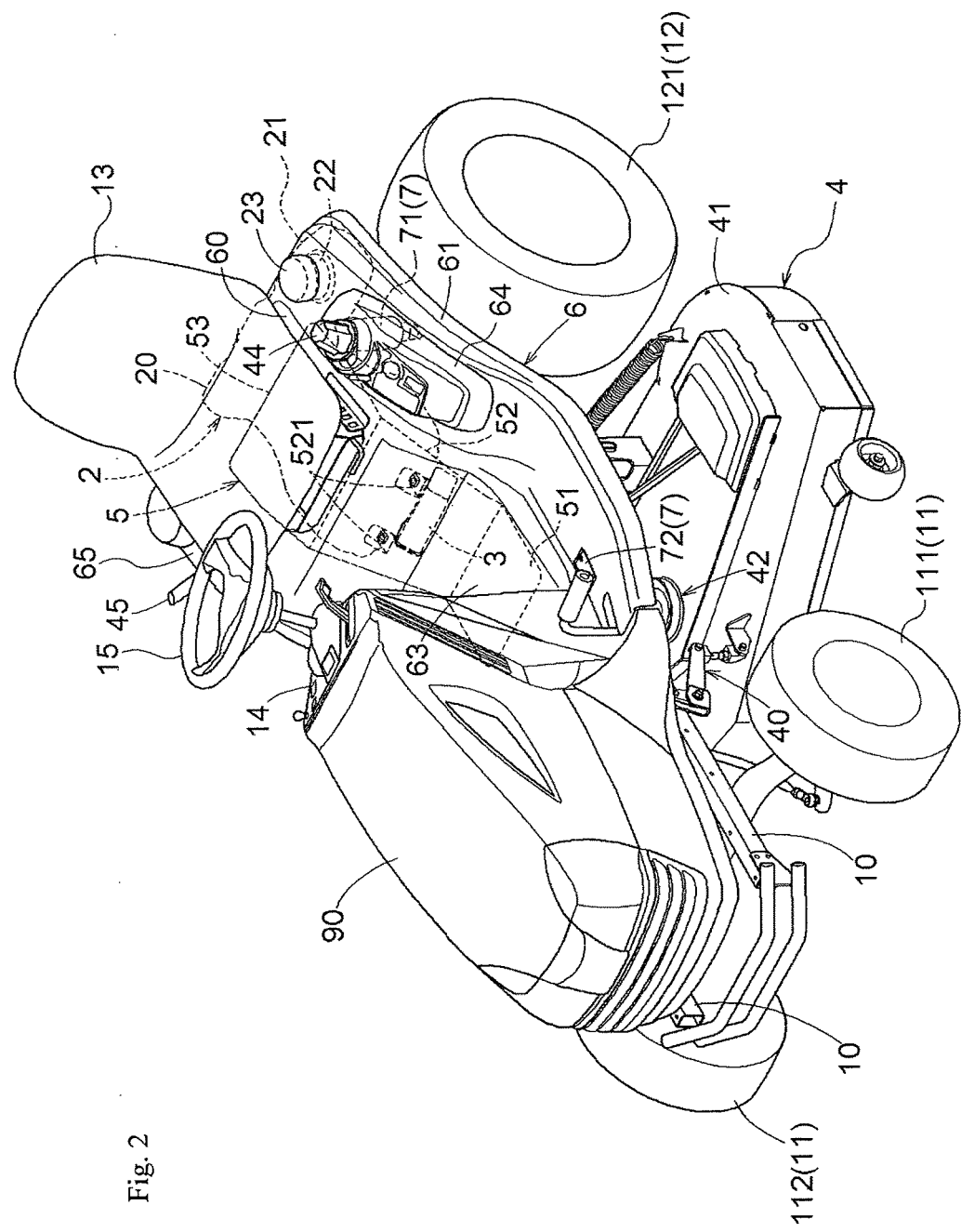
FIG. 2 is a perspective view of a mower vehicle as an embodiment of the invention.
Figure 3:
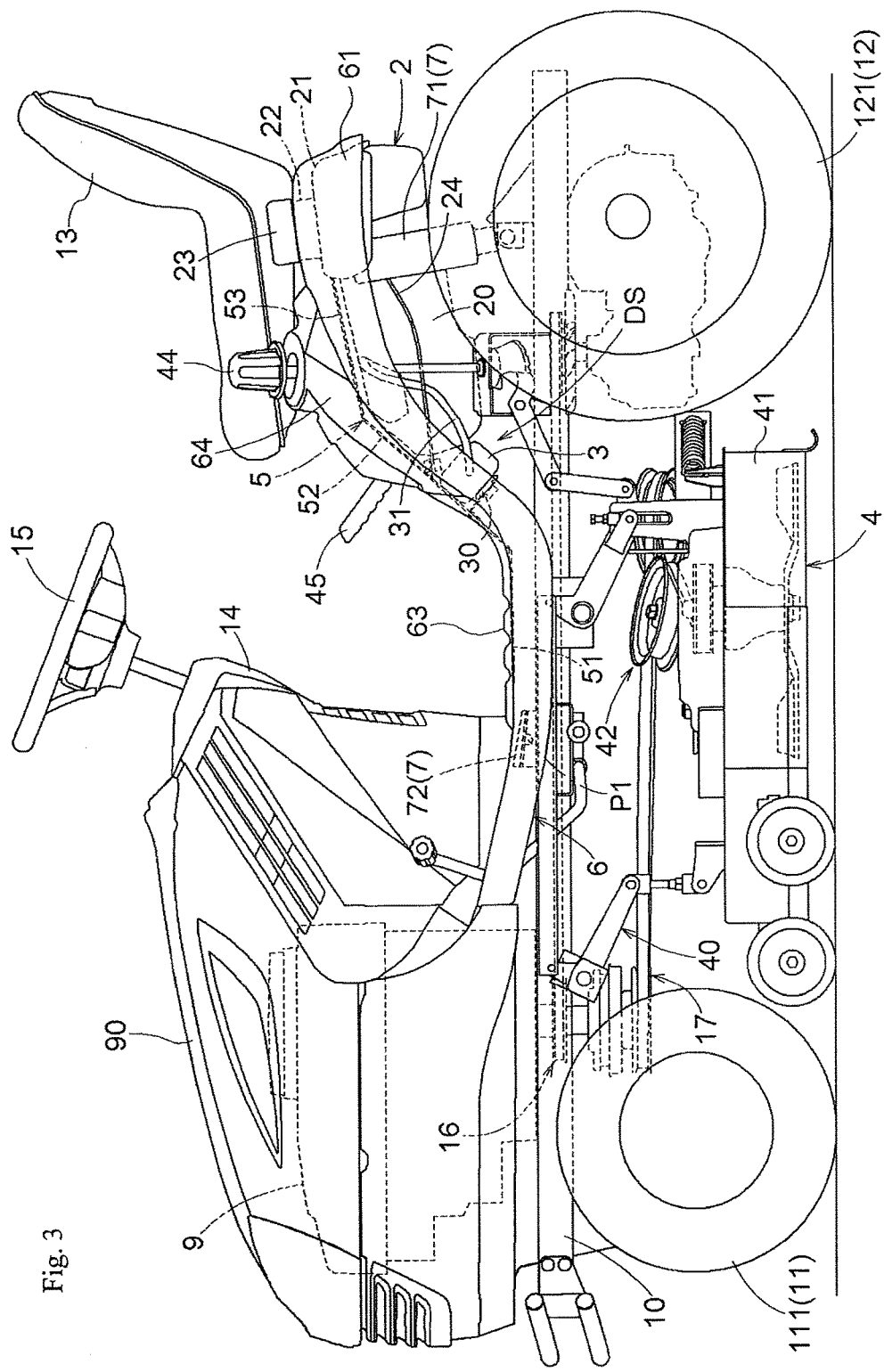
FIG. 3 is a side view of the mower vehicle as the embodiment of the invention.

Next, with reference to the accompanying drawings, a specific embodiment of the work vehicle according to the present invention will be explained. FIG. 2 is a perspective view of a riding mid-mount mower (to be referred to simply as the "mower" hereinafter) as an example of a work vehicle. FIG. 3 is a side view and FIG. 4 is a plane view.

Figure 4:
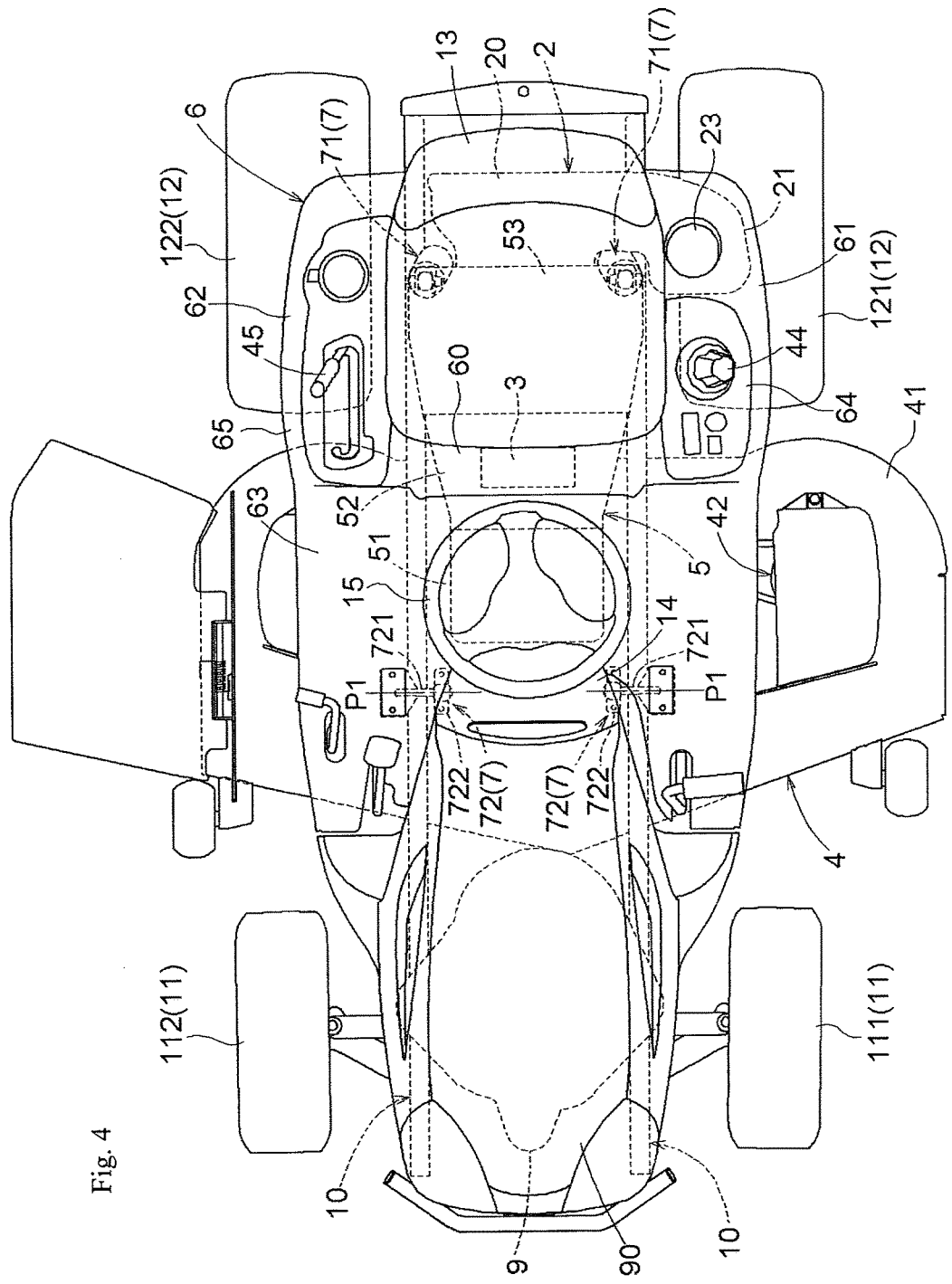
FIG. 4 is a plane view of the mower as the embodiment of the invention.

This mower, as shown in FIG. 2, FIG. 3 and FIG. 4, includes a left front wheel 111 and a right front wheel 112 which are steerable, a left rear wheel 121 and a right rear wheel 122 which are drivable, and a vehicle body frame 10 consisting of a pair of left and right angular pipes extending along the vehicle body front-rear direction. The left front wheel 111 and the right front wheel 112 may be referred to simply as "front wheels 11". The left rear wheel 121 and the right rear wheel 122 may be referred to simply as "rear wheels 12". In a front region of the vehicle body frame 10, the engine 9 covered by a hood 90 is mounted. At a rear end of the hood 90, the handle post 14 is disposed continuously therefrom, and to an upper portion of this handle post 14, the steering wheel 15 is attached. At a rear region of the vehicle body frame 10, there is formed a driver's space including the driver's seat 13. A mower unit 4 is suspended via a lift link mechanism 40 provided in the vehicle body frame 10 between the front wheels 11 and the rear wheels 12.

As shown in FIG. 4, a belt traveling power transmission mechanism 16 for transmitting power of the engine 9 to the rear wheels 12 extends downwardly of the vehicle body frame 10 along the vehicle body front-rear direction. An implement power transmission mechanism 17 receives power from a vertical output shaft of the engine 9 and transmits this to a blade drive unit 42 disposed upwardly of a mower deck 41 of the mower unit 4. In the instant embodiment, inside the mower deck 4, there are accommodated three blades disposed side by side and rotatably driven about vertical axes by the blade drive unit 42. The number of blades is not limited to three, but can be one or two or four or more.

Figure 5:
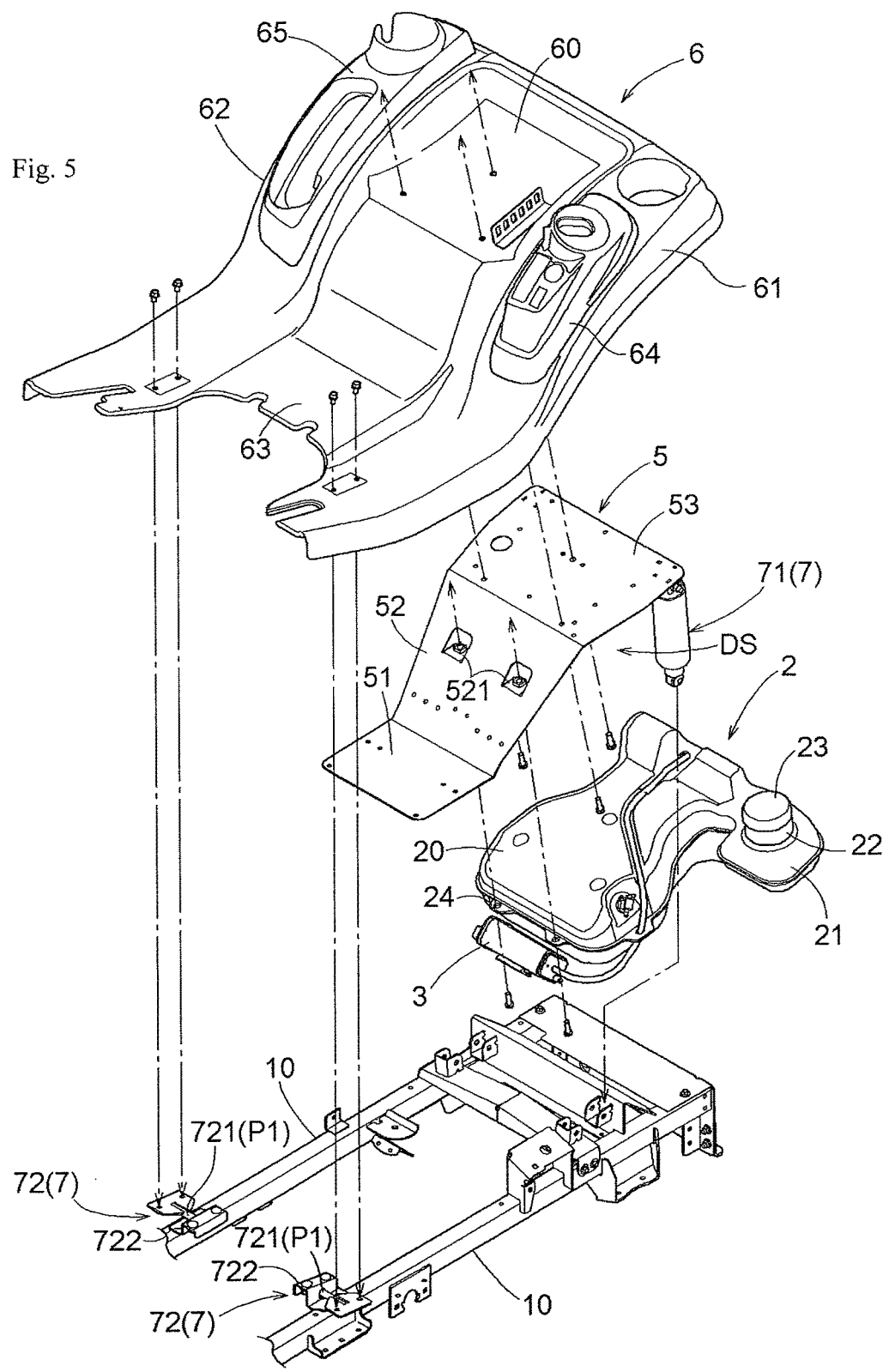
FIG. 5 is an exploded perspective view showing a fender unit, a seat supporting deck, a fuel tank and a canister.

A lower face (side) of the driver's space is formed of the fender unit 6. This fender unit 6 is a formed article made of resin or metal. And, as shown in FIG. 5, the unit 6 consists of a base portion 60, a left fender portion 61, a right fender portion 62 and a floor portion 63. The base portion 60 serves as a mounting face for the driver's seat 13. The left fender portion 61 disposed on the left side of the base portion 60 covers the left rear wheel 121 from above and the right fender portion 62 disposed on the right side of the base portion 60 covers the right rear wheel 122 from above. The floor portion 63 extends forwardly from the base portion 60, the left fender portion 61 and the right fender portion 62. A front portion of the floor portion 63 is cut away to comply with the shape of the handle post 14.

Figure 6:
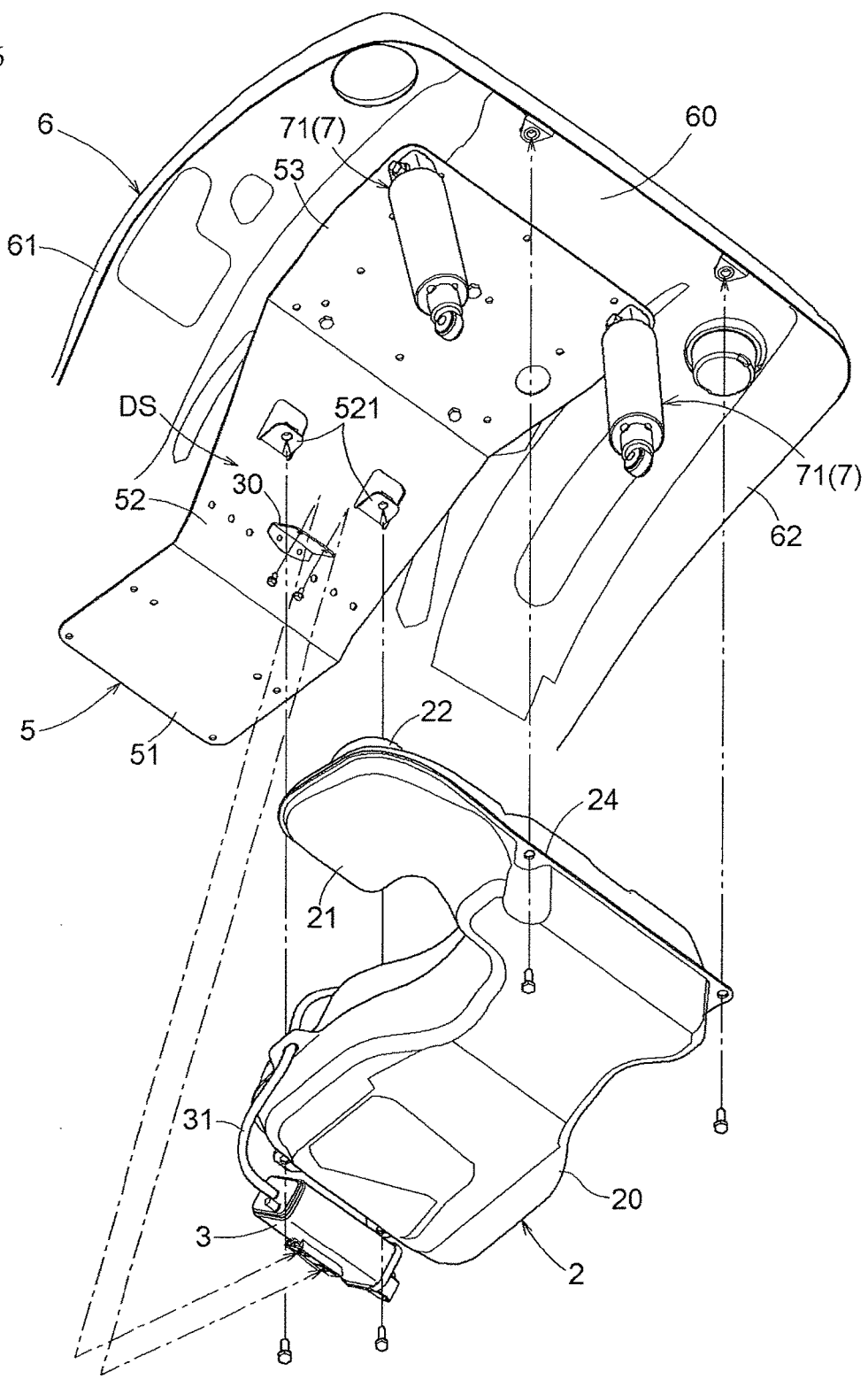
FIG. 6 is an exploded perspective view from the lower side showing the fender unit, the seat supporting deck, the fuel tank and the canister.

The fender unit 6 and the driver's seat 13 are supported to the vehicle body frame 10 via the seat supporting deck 5. The seat supporting deck 5, as shown in FIG. 5 and FIG. 6, comprises a plate member formed by bending a steel sheet or plate at two positions, consisting of the first plate portion 51, the second plate portion 52 and the third plate portion 53. Between the front end of the first plate portion 51 and the vehicle body frame 10, there are provided the pair of left and right pivot modules 72 constituting the suspension unit 7. Each pivot module 72 allows a pivotal movement of the seat supporting deck 5 about the vertical axis P1. In this embodiment, the pivot module 72 consists of a pivot pin 721 and a pin receiver 722 pivotally receiving the pivot pin 721. The pivot pin 721 is fixed to a front end of the first plate member 51 and the pin receiver 722 is fixed to the vehicle body frame 10. Between the rear end of the third plate portion 53 and the vehicle body frame 10, there are provided the pair of left and right suspension modules 71 constituting the suspension unit 7. Each suspension module 71 is a cylinder-like spring damper which per is known. One piston end of the suspension module 71 is connected to a rear end of the third plate portion 53 and the other end of the suspension module 71 is connected to the vehicle body frame 10.

The fender unit 6 is fixed to the upper face of the seat supporting deck 5. In this, the floor portion 63 is placed on the upper face of the first plate portion 51 and the base portion 60 is placed on the upper face of the third plate portion 52. Further, the driver's seat 13 is fixed to the upper face of the base portion 60 of the fender unit 6.

Figure 7:
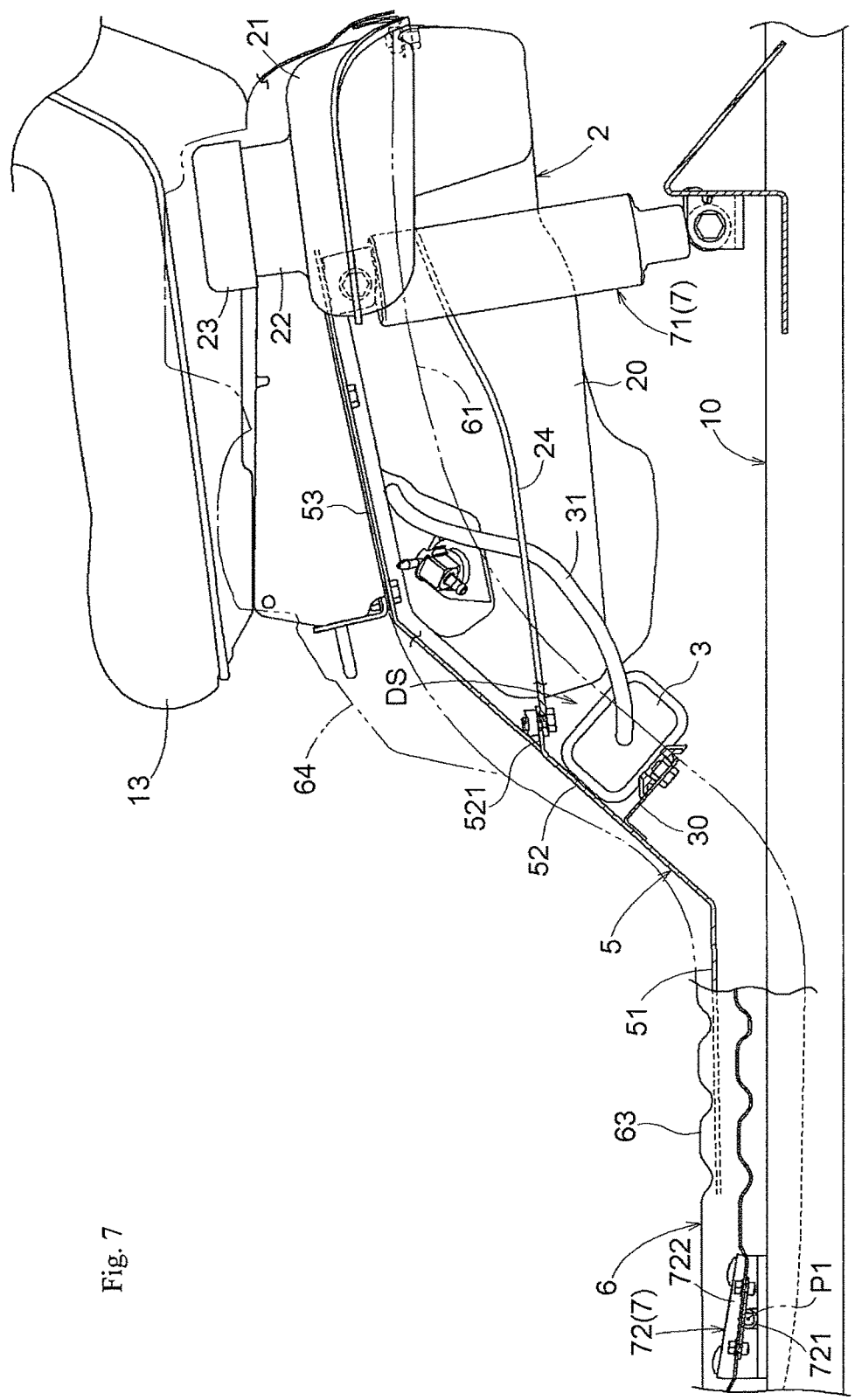
FIG. 7 is a side view showing a driver's seat, the seat supporting deck, the fuel tank, the canister and a suspension unit.

As shown in FIG. 6 and FIG. 7, in a space delimited by the lower face of the second plate portion 52 and the lower face of the third plate portion 53, the fuel tank 2 is disposed. This fuel tank 2 consists of a main body portion 20 and an oil filler portion 21 extending laterally from the rear portion of the main body portion 20. The main body portion 20 has an approximately rectangular parallelepiped shape, but defines recesses in the left and right side faces thereof for avoiding interference with the suspension module 71. On the upper face of the oil filler portion 21, an oil filler pipe 22 is mounted vertically. And, to an oil filler opening of the oil filler pipe 22, an oil filler cap 23 is attached. At the lower face of the second plate portion 52, a projecting piece 521 having a substantially horizontal face in the vehicle body transverse direction extends. As a flange portion 24 formed in circumference of the side wall of the fuel tank 2 is bolt-connected to this projecting piece 521, the fuel tank 2 is fixed to the seat supporting deck 5. Incidentally, though not shown, a bolt is embedded in the upper face of the fuel tank 2 and this bolt extends through the seat supporting deck 5 and the fender unit 6 and is connected eventually to the driver's seat 13. With this, the driver's seat 13, the fender unit 6 and the fuel tank 2 are all fixed integrally to the seat supporting deck 5.

As shown in FIG. 6, in the space DS having a triangular or trapezoidal cross section in the side view formed between the lower face of the second plate portion 52 of the seat supporting deck 5 and the front wall of the fuel tank 2, the canister 3 is disposed. This canister 3, as shown in FIG. 6, has a rectangular parallelepiped shape and is fixed to a canister attaching portion 30 which is bent in the form of a tongue from the second plate portion 52. Incidentally, this canister attaching portion 30 can be provided, not as an integral member of the second plate portion 52, but as a canister bracket which is attached as a separate member to the lower face of the second plate portion 52, and the canister 3 can be fixed to this canister bracket.

As shown in FIG. 5, a canister hose 31 connecting between the canister 3 and the fuel tank 2 extends along the side wall of the fuel tank 2 between a connecting opening provided at one end face of the canister 3 and a connecting opening provided in the upper wall of the fuel tank 2. As the canister 3 and the fuel tank 2 are fixed to the seat supporting deck 5, in the course of a cushioning movement of the seat supporting deck 5, no load such as a bending or torsion will be applied to the canister hose 31.

As shown in FIG. 4, to the left fender portion 61 and the right fender portion 62 of the fender unit 6, a first cover 64 and a second cover 65 are attached respectively. In the first cover 64 and the second cover 65, various hand operational devices or tools to be operated by a driver's hand will be disposed. For instance, in the instant embodiment, in the first cover 64, there is disposed a cutting height control grip 44 for setting a cutting height of the mower unit 4. In the second cover 65, there is disposed a lift control lever 45 of the mower unit 4. The lift control lever 45 is pivotable about a vertical axis, such that in response to a pivotal movement thereof to rear upper side, the mower unit 4 will be elevated, whereas in response to a pivotal movement thereof to forward lower side, the mower unit 4 will be lowered.

OTHER EMBODIMENTS (1) In the foregoing embodiment, the seat supporting deck 5 is formed of a plate member. Instead, the deck 5 may use a different member such as an angular member at least at a portion thereof.

(2) In the foregoing embodiment, one fuel tank 2 and one canister 3 are mounted. Instead, a plurality of fuel tanks 2 and a plurality of canisters 3 may be mounted.

(3) The layout of the fuel tank 2 and the canister 3 disclosed in the foregoing embodiment is only exemplary. The positions of the connecting opening provided in the canister 3 and the connecting opening provided in the fuel tank 2 can be freely selected, and the layout of the canister 31 will be determined optimally, in accordance with the positions of the connecting openings.

(4) In the foregoing embodiment, a mower is employed as a work vehicle. In addition to a mower, the present invention is applicable also to other work vehicles such as a snowplow vehicle etc.

DESCRIPTION OF REFERENCE MARKS/NUMERALS

10: vehicle body frame
11: front wheel
13: driver's seat
2: fuel tank
3: canister
30: canister attaching portion
5: seat supporting deck
51: first plate portion
52: second plate portion
521: projecting piece
53: third plate portion
6: fender unit
60: base portion
61: left fender portion
62: right fender portion
63: floor portion
64: first cover
65: second cover
7: suspension unit
71: suspension module
72: pivot module
721: pivot pin
722: pin receiver
9: engine
DS: space
P1: pivot axis

The invention claimed is:

1. A work vehicle having an engine mounted thereto, comprising:
   a vehicle body frame extending in a longitudinal direction of vehicle;
   a seat supporting deck supported to the vehicle body frame via a suspension unit;
   a driver's seat supported on an upward side of the seat supporting deck;
   a fuel tank supportively connected to the seat supporting deck and being spaced from and located below the driver's seat, said fuel tank being configured to supply fuel to the engine; and a canister supportively connected to the seat supporting deck and located adjacent to the fuel tank, wherein vibration of the vehicle body frame is not transmitted directly to the fuel tank and canister.

2. The work vehicle according to claim 1, wherein the fuel tank is fixed to a lower face of the seat supporting deck; and the canister also is fixed to the lower face of the seat supporting deck in vicinity of a front wall of the fuel tank.

3. The work vehicle according to claim 2, wherein:
the suspension unit includes a pair of left and right suspension modules each being vertically displaceable by a predetermined cushion stroke and pivot modules each having a pivot pin extending in a vehicle body transverse direction and a pin receiver for receiving the pivot pin; and
a rear portion of the seat supporting deck is supported to the vehicle body frame via the suspension modules and a front portion of the seat supporting deck is supported to the vehicle body frame via the pivot modules.

4. A work vehicle having an engine mounted thereto, comprising:
a vehicle body frame extending in a longitudinal direction of vehicle;
a seat supporting deck supported to the vehicle body frame via a suspension unit;
a driver's seat supported on an upward side of the seat supporting deck;
a fuel tank supported by the seat supporting deck and being located below the driver's seat, said fuel tank being configured to supply fuel to the engine;
a canister supported by the seat supporting deck and located adjacent to the fuel tank;
a fender unit including a base portion, a left fender portion covering the left rear wheel, a right fender portion covering the right rear wheel, and a floor portion;
the base portion being supported to the seat supporting deck between the driver's seat and the seat supporting deck; and
the floor portion extending from the base portion, the left fender portion and the right fender portion to a forward side of the driver's seat.

5. The work vehicle according to claim 4, wherein the seat supporting deck comprises a plate member including a first plate portion extending horizontally in the longitudinal direction of the vehicle to support the floor portion, a third plate portion extending in the vehicle body front-rear direction at a position higher than the first plate portion to support the base portion, and a second plate portion assuming a tilted posture to connect between the first plate portion and the third plate portion.

6. The work vehicle according to claim 4, wherein the canister is disposed in a space having a triangular cross section in its side view and delimited by the second plate portion and a front wall of the fuel tank.

7. The work vehicle according to claim 5, wherein:
the suspension unit includes a pair of left and right suspension modules each being vertically displaceable by a predetermined cushion stroke and pivot modules each having a pivot pin extending in a vehicle body transverse direction and a pin receiver for receiving the pivot pin;
the third plate portion is supported to the vehicle body frame via the suspension modules; and
the first plate portion is supported to the vehicle body frame via the pivot modules.

8. The work vehicle according to claim 1, wherein the work vehicle is a riding mower and the seat supporting deck comprises rear wheel fender portions.

9. The work vehicle according to claim 1, wherein the driver's seat has a front side, a rear side and later sides and wherein the fuel tank and the canister are located adjacent one of the lateral sides.

10. The work vehicle according to claim 1, wherein the seat supporting deck comprises wheel fender portions.

11. The work vehicle according to claim 10, wherein the fuel tank and the canister are located on an underside of one of the wheel fender portions.

12. The work vehicle according to claim 1, wherein the fuel tank and the canister are spaced from the vehicle body frame, whereby vibration of the vehicle body frame is transmitted to the fuel tank and the canister indirectly via the suspension unit.

13. A riding mower comprising:
a vehicle body frame extending in a longitudinal direction of vehicle;
a seat supporting deck mounted to the vehicle body frame;
at least one suspension device having a first end coupled to the vehicle body frame and a second end coupled to a rear side of the seat supporting deck;
a driver's seat mounted to the seat supporting deck;
a fuel tank connected to and located beneath the seat supporting deck, said fuel tank being configured to supply fuel to the engine; and
a canister connected to and located beneath the seat supporting deck.

14. The work vehicle according to claim 13, wherein the fuel tank and the canister are spaced from the vehicle body frame, whereby vibration of the vehicle body frame is not transmitted directly to the fuel tank and canister.

15. The work vehicle according to claim 13, wherein the seat supporting deck comprises left and right wheel fender portions.

16. The work vehicle according to claim 13, wherein the driver's seat has a front side, a rear side and later sides and wherein the fuel tank and the canister are located adjacent one of the lateral sides.

17. The work vehicle according to claim 13, wherein the seat supporting deck comprises rear wheel fender portions.

18. The work vehicle according to claim 17, wherein the fuel tank and the canister are located on an underside of one of the rear wheel fender portions.

* * * * *